UNITED STATES PATENT OFFICE.

HUGO JAESSCHIN AND OSKAR KALTWASSER, OF BERLIN, GERMANY, ASSIGNORS TO ACTIEN-GESELLSCHAFT FÜR ANILIN FABRIKATION, OF SAME PLACE.

BLUE AZO DYE AND PROCESS OF MAKING SAME.

SPECIFICATION forming part of Letters Patent No. 684,065, dated October 8, 1901.

Application filed July 12, 1901. Serial No. 67,998. (No specimens.)

*To all whom it may concern:*

Be it known that we, HUGO JAESSCHIN and OSKAR KALTWASSER, of Berlin, in the Kingdom of Prussia, German Empire, have invented new and useful Improvements in the Production of Mordant-Dyeing Monoazo Coloring-Matter; and we do hereby declare that the following is a full, clear, and exact description thereof, which will enable others skilled in the art to which it appertains to make and use the same.

We have found that a valuable monoazo dyestuff is produced if the diazo compound derived from 4-chloro-2-amidophenol sulfonic acid is combined with the 1.8-amidonaphthol-3.6-disulfonic acid. This dyestuff when fixed on wool with the aid of copper salts yields shades which are distinguished by their extraordinary clearness. Moreover, they are neither uneven nor dull, which inconveniences will often occur if dyeing with coloring-matters susceptible of forming copper-lakes is carried out in an acid-bath on the addition of copper salts.

For the production of the 4-chloro-2-amidophenol sulfonic acid employed as a parent material we proceed as follows: Twenty-five kilos of 4-chloro-2-nitrophenol are heated with a solution of one hundred kilos of sodium bisulfite and five hundred liters of water in a vessel combined with a reflux condenser and the mixture is kept boiling until the 4-chloro-2-nitrophenol has disappeared, a clear solution thus being formed. One hundred kilos of hydrochloric acid (specific gravity 12° Baumé) are now added thereto and the mass is boiled for some time in order to expel the excess of sulfurous acid. On refrigeration the 4-chloro-2-amidophenol sulfonic acid separates as a crystalline mass, easily soluble in boiling water, hardly soluble in cold water or in alcohol. Its sodium salt crystallizes from hot water in the form of shining leaflets.

In order to transform the 4-chloro-2-amidophenol sulfonic acid into the new monoazo dyestuff, we proceed as follows: 22.3 kilos of 4-chloro-2-amidophenol sulfonic acid are diazotized in the well-known way by means of seven parts of sodium nitrite and mineral acid. The yellowish diazo solution thus formed is run into a solution of thirty-two kilos of 1.8-amidonaphthol-3.6-disulfonic acid, care being taken to keep the mixture alkaline by the addition of sodium carbonate. The new dyestuff is then precipitated from the solution obtained by means of common salt. It is filtered, pressed, and dried.

The result is not materially changed if for the above-described 4-chloro-2-amidophenol sulfonic acid the isometric sulfo-acid is substituted, which may be obtained by introducing one part, by weight, of 4-chloro-2-amidophenol into four parts of sulfuric acid monohydrate, heating the mixture gently for some time, and finally pouring it into ice-water.

The new dyestuff forms in the dry state a dark powder easily soluble in water to a red-violet solution, the coloration of which changes to blue on addition of sodium carbonate and to a fine red on the addition of mineral acids. The dye dissolves easily in concentrated sulfuric acid, forming a red-violet solution, which by dilution with ice-water turns red. It is but hardly soluble in alcohol to a bluish-red solution. When fixed on wool with the aid of copper salts, it yields fine blue shades, distinguished by their extraordinary fastness.

Having thus described our invention and in what manner the same is to be performed, what we claim as new is—

The new monoazo dye obtained by combining diazotized 4-chloro-2-amidophenol sulfonic acid with 1.8-amidonaphthol-3.6-disulfonic acids; said dye forming in the dry state a dark powder, easily soluble in water to a red-violet solution, the coloration of which changes to blue on the addition of sodium carbonate and to a fine red on the addition of mineral acids; the dye dissolving easily in concentrated sulfuric acid to a red-violet solution, which by dilution with ice-water turns red; being hardly soluble in alcohol to a bluish-red solution; producing on wool, when fixed with the aid of copper salts, fine blue shades of an extraordinary fastness.

In witness whereof we have hereunto signed our names, this 21st day of June, 1901, in the presence of two subscribing witnesses.

HUGO JAESSCHIN.
OSKAR KALTWASSER.

Witnesses:
WOLDEMAR HAUPT,
HENRY HASPER.